US008676576B2

(12) United States Patent
Nomitsu

(10) Patent No.: US 8,676,576 B2
(45) Date of Patent: Mar. 18, 2014

(54) INFORMATION PROCESSING SYSTEM, INFORMATION PROCESSING APPARATUS, INFORMATION PROCESSING PROGRAM AND RECORDING MEDIUM

(75) Inventor: Eiichirou Nomitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 1054 days.

(21) Appl. No.: 12/355,967

(22) Filed: Jan. 19, 2009

(65) Prior Publication Data
US 2009/0187403 A1   Jul. 23, 2009

(30) Foreign Application Priority Data

Jan. 21, 2008 (JP) ................................ 2008-010356

(51) Int. Cl.
*G01L 15/00* (2006.01)
(52) U.S. Cl.
USPC ............... 704/235; 704/256; 704/3; 709/231; 709/226; 709/229; 713/193; 705/37; 705/64; 717/170; 726/30; 375/240.28
(58) Field of Classification Search
USPC ............ 704/3, 256; 707/999.001; 705/64, 37; 709/231, 229, 226; 713/193; 717/170; 726/30; 375/240.28
See application file for complete search history.

(56) References Cited

U.S. PATENT DOCUMENTS

| 5,832,430 | A  | * | 11/1998 | Lleida et al. ................... 704/256 |
| 5,918,223 | A  |   | 6/1999  | Blum et al. |
| 6,209,097 | B1 | * | 3/2001  | Nakayama et al. ............ 713/193 |
| 6,684,254 | B1 | * | 1/2004  | Dutta ............................. 709/229 |
| 2002/0165828 | A1 | * | 11/2002 | Sakamoto ........................ 705/64 |
| 2003/0105739 | A1 | * | 6/2003  | Essafi et al. ........................ 707/1 |
| 2004/0102957 | A1 | * | 5/2004  | Levin ................................ 704/3 |
| 2006/0253586 | A1 | * | 11/2006 | Woods ........................... 709/226 |
| 2007/0043739 | A1 | * | 2/2007  | Takai et al. ...................... 707/10 |
| 2008/0215474 | A1 | * | 9/2008  | Graham .......................... 705/37 |
| 2008/0288653 | A1 | * | 11/2008 | Adams ........................... 709/231 |

FOREIGN PATENT DOCUMENTS

| JP | 2000222264 A  | 8/2000  |
| JP | 2001136363 A  | 5/2001  |
| JP | 2002056129 A  | 2/2002  |
| JP | 2002358374 A  | 12/2002 |
| JP | 2003248684 A  | 9/2003  |
| WO | 2002082271 A1 | 10/2002 |

OTHER PUBLICATIONS

European Search Report for EP 09 15 0186 completed Oct. 13, 2009.
T. J. Hazen et al., "Topic Indentification From Audio Recordings Using Word and Phone Recognition Lattices", Automatic Speech Recognition & Understanding, IEEE, Dec. 1, 2007, pp. 659-664.
J. McDonough et al., "Approaches to Topic Identification on the Switchboard Corpus", IEEE, Apr. 19, 1994, pp. I/385-I/388.
Japanese Office Action for JP2008-010356 mailed on Jun. 12, 2012.

* cited by examiner

*Primary Examiner* — Michael Colucci
(74) *Attorney, Agent, or Firm* — Sughrue Mion, PLLC

(57) ABSTRACT

A copyright managing information processing apparatus includes a storage module for storing copyrighted content including audio data; a first topic module for recognizing audio data in content opened to the public by a to-be-opened information processing apparatus, converting the audio data into text data, extracting keywords from the text data, and conducting topic processing using the keywords to create topic information; a second topic module for recognizing audio data in content stored in the storage means, converting the audio data into text data, extracting keywords from the text data, and conducting topic processing using the keywords to create topic information; and a similarity determining module for comparing the topic information generated by the first topic module with that created by the second topic module for thereby determining presence or absence of similarity therebetween.

7 Claims, 5 Drawing Sheets

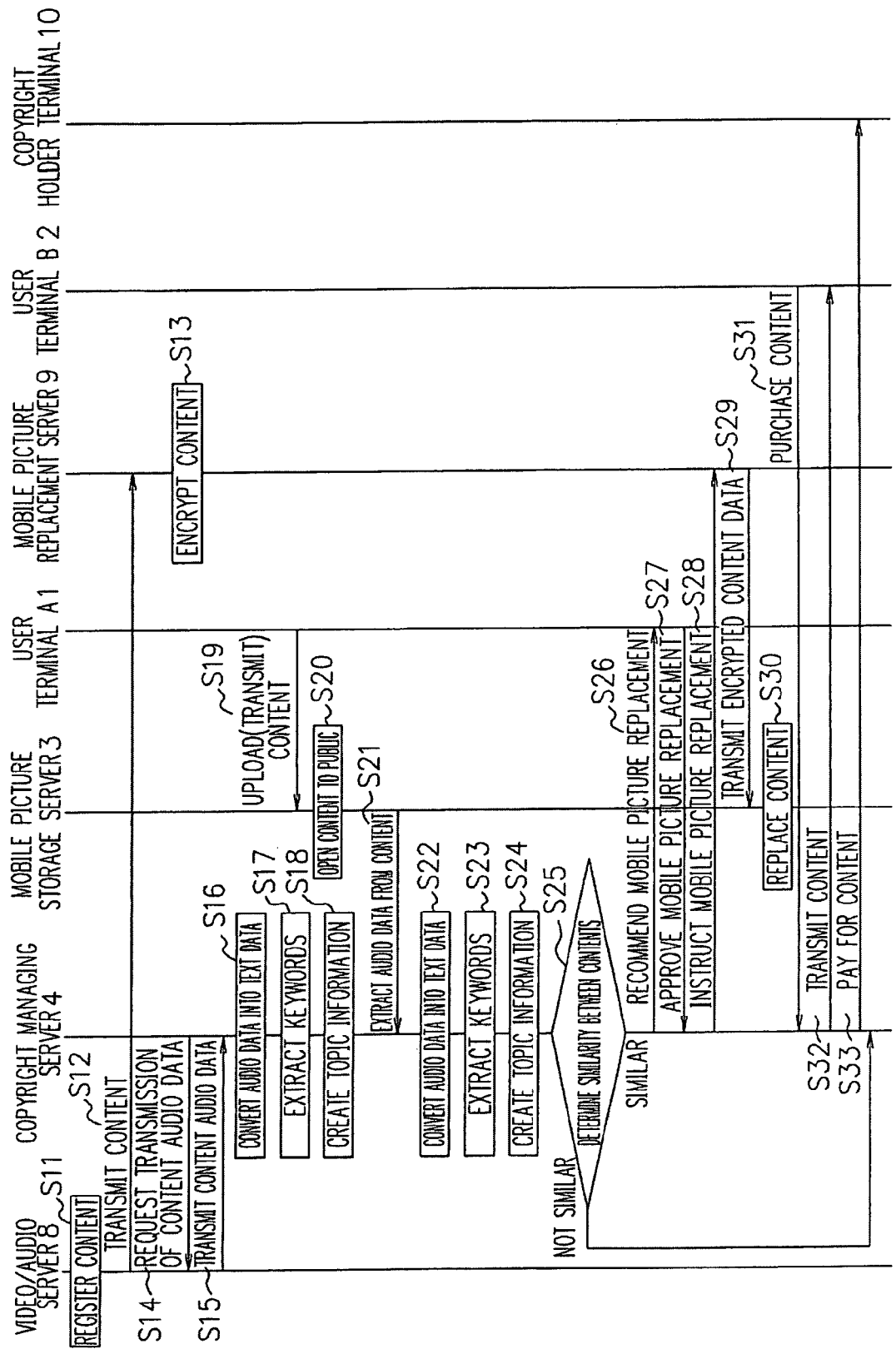

INFORMATION PROCESSING SYSTEM, INFORMATION PROCESSING APPARATUS, INFORMATION PROCESSING PROGRAM AND RECORDING MEDIUM

This application is based upon and claims the benefit of priority from Japanese patent application No. 2008-010356, filed on Jan. 21, 2008, the disclosure of which is incorporated herein in its entirety by reference.

BACKGROUND OF THE INVENTION

1. Field of the Invention

The present invention relates to an information processing system, an information processing apparatus, an information processing program, and a recording medium, and in particular, to a method of managing content uploaded, and the like.

2. Description of the Related Art

Conventionally, copyrights for contents such as a large volume of mobile picture files which are uploaded by individuals (users) and which exist in, for example, home pages, blogs, community services are managed by use of human power. Each of content is confirmed, for example, by visually checking or by viewing the content. For a person who has violated the copyright assigned to the content, the copyright managing system takes an action, for example, issues a warning message to the person or deletes the content.

Japanese Patent Laid-Open Publication Ser. No. 2002-358374 discloses a technique related to a data exchange system. In the system, when a user desires to exchange data, the user refers to a list of copyrighted materials registered by copyright holders to determine based on information of the list whether or not a copyright exists for the data. If the data is copyrighted, the system restricts access to the data.

SUMMARY

However, according to the conventional copyright managing method, the operation is limited to human jobs, which disadvantageously requires quite a long period of time and operation steps. Since the violation of copyright cannot be completely detected to be exposed, there remain a large number of contents which trespasses the copyrights.

If such contents are once deleted in accordance with the related art, none of the general user can access the contents. That is, the presence and the details of the contents cannot be known to the public, which hence closes the door for the advertisement and publicity of the contents. This resultantly sets limits on free distribution of the contents on the Internet and there arises a problem that the copyright holders and service providers thereof lose a chance of sales promotion as well as a selling chance of the contents.

In the technique described in Japanese Patent Laid-Open Publication Ser. No. 2002-358374, since it is assumed that the user accesses the list of copyrighted materials, the system is unable to manage contents uploaded in an arbitrary way.

It is therefore an exemplary object of the present invention, devised to resolve the above problems, to provide an information processing apparatus and the like capable of efficiently managing the copyrights of the uploaded contents.

To achieve the exemplary object, the present invention has exemplary aspects as follows.

To solve the problem, an information processing system according to an exemplary aspect of the present invention includes a terminal, a to-be-opened information processing apparatus connectible via a network to the terminal, and a copyright managing information processing apparatus connectible via a network to the to-be-opened information processing apparatus. The terminal includes a transmitter for transmitting to the to-be-opened information processing apparatus content including audio data, the content being inputted from a user. The to-be-opened information processing apparatus includes a content receiver for receiving the content from the terminal connected via the network to the to-be-opened information processing apparatus and an opening module for opening the received content to the public on the network. The copyright managing information processing apparatus includes a storage for storing copyrighted content including audio data, a first topic module for recognizing audio data in content opened to the public by the to-be-opened information processing apparatus, converting the audio data into text data, extracting keywords from the text data, and conducting topic processing using the keywords to create topic information; a second topic module for recognizing audio data in content stored in the storage, converting the audio data into text data, extracting keywords from the text data, and conducting topic processing using the keywords to create topic information; and a similarity determining module for comparing the topic information generated by the first topic module with that created by the second topic module and for thereby determining presence or absence of similarity therebetween.

A copyright managing information processing apparatus according to an exemplary aspect of the present invention includes a storage for storing copyrighted content including audio data, a first topic module for recognizing audio data in content opened to the public by a to-be-opened information processing apparatus, converting the audio data into text data, extracting keywords from the text data, and conducting topic processing using the keywords to create topic information; a second topic module for recognizing audio data in content stored in the storage, converting the audio data into text data, extracting keywords from the text data, and conducting topic processing using the keywords to create topic information; and a similarity determining module for comparing the topic information generated by the first topic module with that created by the second topic module and for thereby determining presence or absence of similarity therebetween.

A copyright managing information processing method according to an exemplary aspect of the present invention includes a step of storing copyrighted content including audio data, a first topic step of recognizing audio data in content opened to the public by a to-be-opened information processing apparatus, converting the audio data into text data, extracting keywords from the text data, and conducting topic processing using the keywords to create topic information; a second topic step of recognizing audio data in content stored by the storing step, converting the audio data into text data, extracting keywords from the text data, and conducting topic processing using the keywords to create topic information; and a similarity determining step of comparing the topic information generated by the first topic step with that created by the second topic step and of thereby determining presence or absence of similarity therebetween.

An information processing program, according to an exemplary aspect of the present invention, makes a computer included in a copyright managing information processing apparatus including a storage module for storing copyrighted content including audio data, conduct functions of first topic processing of recognizing audio data in content opened to the public by a to-be-opened information processing apparatus, converting the audio data into text data, extracting keywords from the text data, and conducting topic processing using the keywords to create topic information; second topic processing of recognizing audio data in content stored in the storage module, converting the audio data into text data, extracting keywords from the text data, and conducting topic processing using the keywords to create topic information; and similarity determining processing of comparing the topic information generated by the first topic processing with that created by the second topic processing and of thereby determining presence or absence of similarity therebetween.

A computer-readable recording medium according to an exemplary aspect of the present invention stores the information processing program in accordance with the present invention.

BRIEF DESCRIPTION OF THE DRAWINGS

The exemplary objects and features of the present invention will become more apparent from the consideration of the following detailed description taken in conjunction with the accompanying drawings in which:

FIG. 5 is a sequence chart showing an outline of processing in the exemplary embodiment of a copyright managing system.

DESCRIPTION OF THE EXEMPLARY EMBODIMENTS

Figure 1:
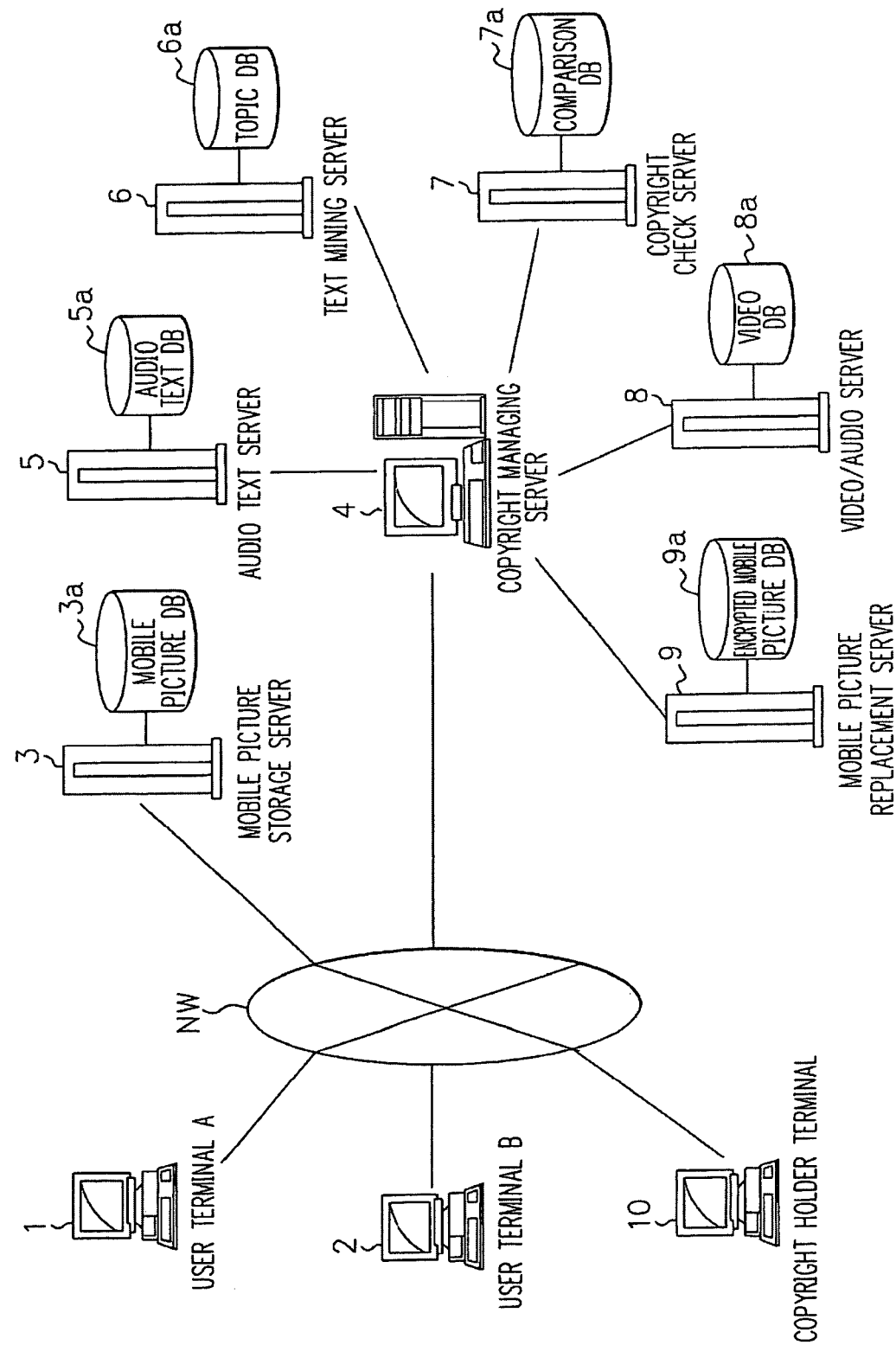
FIG. 1 is a schematic block diagram showing an example of structure of a first exemplary embodiment.
Figure 2:
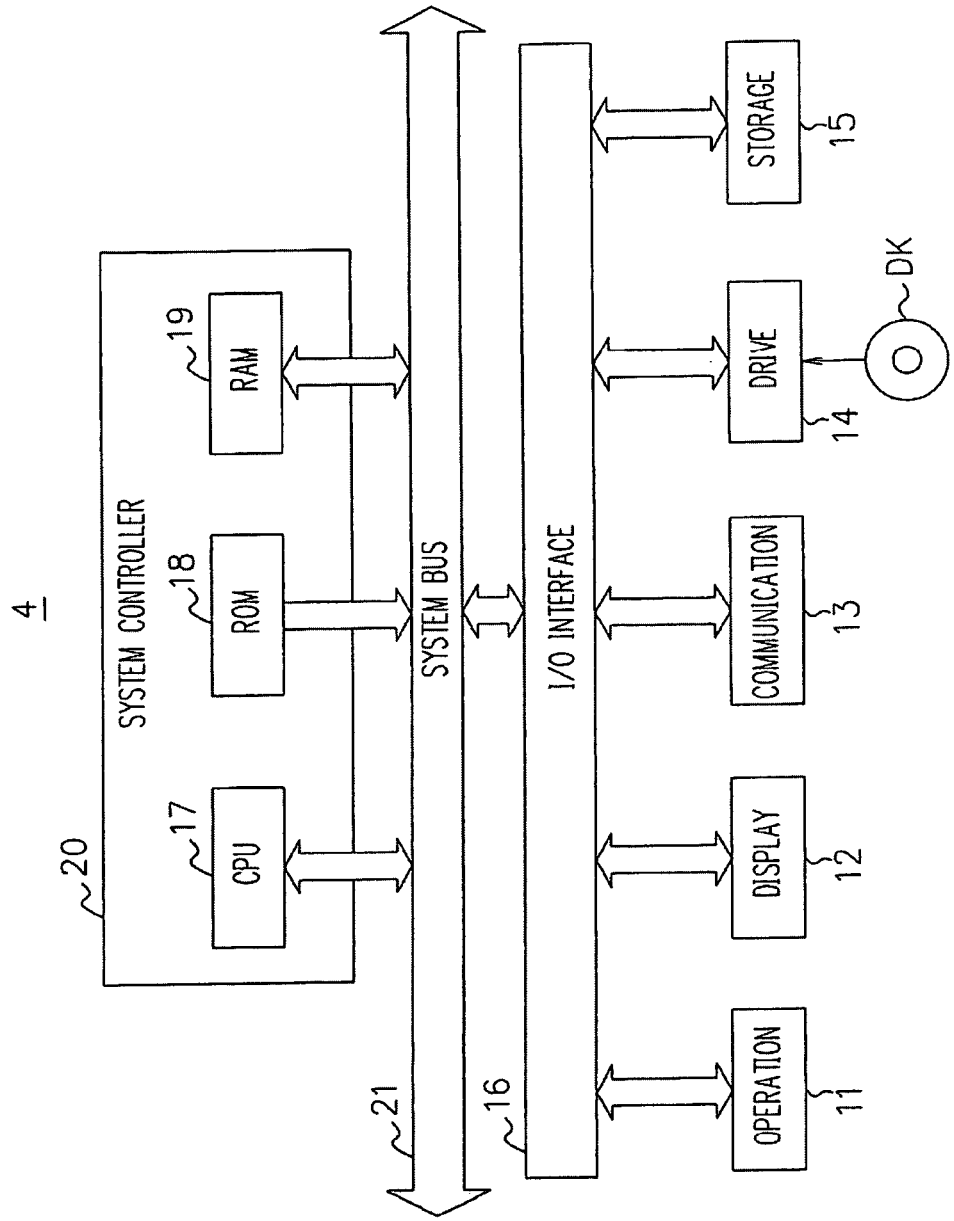
FIG. 2 is a block diagram showing an example of a configuration of a copyright managing server in accordance with the first exemplary embodiment.

Referring next to FIGS. 1 and 2, description will be given of structure and functions of a copyright managing system S in the exemplary embodiment.

FIG. 1 shows and example of the structure of the copyright managing system S in the exemplary embodiment.

As FIG. 1 shows, the copyright managing system S includes a user terminal A1, a user terminal B2, a mobile picture storage server 3 as an example of a to-be-opened information processing apparatus, a copyright managing server 4 as an example of a copyright managing information processing apparatus, an audio text server 5, a text mining server 6, a copyright check server 7, video/audio server 8, a mobile picture replacement server 9, and a copyright holder terminal 10.

The mobile picture storage server 3 and the copyright managing server 4, the user terminals A1 and B2, and the terminal 10 can communicate data with each other via a network NW using a communication protocol, for example, Transmission Control Protocol/Internet Protocol (TCP/IP). The network NW includes, for example, the Internet, a leased communication line such as a Community Antenna Television (CATV) line, a mobile communication network including a base station, and a gateway. The servers 4 to 9 can communicate data with each other via, for example, a Local Area Network (LAN).

The user terminals A1 and B2 and the copyright holder terminal 10 serves as terminals in the system, that is, each thereof is adopted to upload content in the mobile picture storage server 3, to browse or to purchase the content uploaded in the mobile picture storage server 3, or to make a payment to the copyright holder of the content. As such terminals, there may be employed, for example, a personal computer, a Personal Digital Assistant (PDA), a Set Top Box (STB), and a cellular phone including a Web browser application and an e-mail application installed therein.

The mobile picture storage server 3 is a server computer to function as a receiver module and an opening module in the exemplary embodiment. For example, as a receiver module, the mobile picture storage server 3 communicates content with, for example, the user terminal A1 via a File Transfer Protocol (FTP) and stores a received file in a mobile picture DataBase (DB) 3a. As an opening module, the mobile picture storage server 3 conducts operation, for example, to display content registered to the mobile picture database 3a on a display (not shown), of the user terminal B2 in response to a browsing request from, for example, the user terminal B2. The mobile picture storage server 3 executes processing in which using a script language described in, for example, HTML, a Hypertext Preprocessor (PHP) retrieves the content or generates a display screen thereof. The mobile picture storage server 3 then transmits results of the processing via the network NW to the Web browser of the user terminal B2, to thereby provide the content to the user. The mobile picture storage server 3 may be any server which the user arbitrarily selects to upload content or may be limited to a particular server.

The copyright managing server 4 is a server computer which comprehensively supervises the servers 5 to 9 to manage copyrights of contents uploaded from, for example, the user terminal A1 via the network NW to the mobile picture storage server 3.

Specifically, in response to an operation of, for example, a copyright manager, the copyright managing server 4 extracts audio data from content registered to the mobile picture database 3a and audio data from copyrighted content stored in a video database 8a to convert each audio data into text data. From the text data of each of the contents, the copyright managing server 4 extracts keywords, which are words including a name of a player if the content is a film. For each content, the copyright managing server 4 conducts a topic operation, for example, to extract keywords in an order of frequency of appearance thereof in the content. The copyright managing server 4 resultantly creates topic information of the content, for example, a list of keywords in an order of frequency of appearance thereof. By comparing the topic information among the contents, presence or absence of similarity therebetween are determined. As a result, it is determined whether or not the content registered to the database 3b is copyrighted.

The audio text server 5 is a server computer to manage an audio text database 5a and conducts its operation using, for example, a Relational DataBase Management System (RDBMS) such as MySQL. Specifically, in response to a request from, for example, the copyright managing server 4 or a server computer (not shown), the audio text server 5 carries out operations. For example, the audio text server 5 registers and updates new text data converted by the copyright managing server 4 to the audio text database 5a. The audio text server 5 also retrieves and outputs information from the audio text database 5a.

The text mining server 6 as a server computer to manage a topic database 6a achieves its operation by use of, for example, RDBMS such as MySQL. In response to a request from the copyright managing server 4 or a server computer (not shown), the text mining server 6 executes processing. For example, the topic information created by the copyright managing server 4 is registered and updated to the topic database 6a as well as information is retrieved and delivered from the topic database 6a.

The copyright check server 7 is a server computer to manage a comparison database 7a and carries out its operation using RDBMS such as MySQL. Concretely, in response to a request from the copyright managing server 4 or a server computer (not shown), the copyright check server 7 executes processing. The copyright check server 7 registers a result of determination for similarity between the contents to the comparison database 7a and updates the result therein. The copyright check server 7 also retrieves information from the comparison database 7a and delivers the information therefrom.

The video/audio server 8 is a server computer to manage a video database 8a and conducts its operation using RDBMS such as MySQL and serves as a storage in the exemplary embodiment. The copyright check server 7 executes processing in response to a request from the copyright managing server 4 or a server computer (not shown). The copyright check server 7 registers copyrighted content to the video database 8a and updates the contents as well as retrieves and outputs information therefrom.

In this specification, "copyrighted content" indicates content for which, for example, a copyright holder of the content has requested the system to manage the copyright. For example, the request of the holder is as below. If a user accesses the content without admission of the copyright holder, for example, if the user uploads the content in a desired server, the system issues a warning message to the user or recommends the user to suspend use of the content. The video database 8a hence contains files of such contents, i.e., video files of, for example, the WMV format, the Moving Picture Experts Group (MPEG) format, or the DivX Media Format.

The mobile picture replacement server 9 is a server computer to manage an encrypted mobile picture database 9a and conducts its operation using RDBMS such as MySQL. In response to a request from the copyright managing server 4 or a server computer (not shown), the mobile picture replacement server 9 executes processing. For example, the mobile picture replacement server 9 registers a file produced by encrypting a copyrighted content to the encrypted mobile picture database 9a and updates the file. The mobile picture replacement server 9 also retrieves and outputs information from the encrypted mobile picture database 9a. In the encryption of the content, the system adopts a scrambling operation to encrypt the content into an irreproducible form by use of, for example, a Content Scramble System (CSS). This technique is well known and hence will not be described in detail. The encryption also includes a technique based on the digital copyright management technology in which although the content can be browsed and downloaded, the execution of the file of the content thus downloaded is restricted until an appropriate license is acquired.

Referring now to FIG. 2, description will be given of structure and functions of the copyright managing server 4.

FIG. 2 shows in a block diagram of an example structure of the copyright managing server 4 in accordance with the exemplary embodiment.

As can be seen from FIG. 2, the copyright managing server 4 includes an operation module 11, a display module 12 including, for example, a liquid-crystal display, a communication module 13, a drive module 14, a storage 15, an input/output interface module 16, and a system controller 20. The system controller 20 is connected via a system bus 21 to the I/O interface module 16.

The operation module 11 includes, for example, a keyboard and a mouse. The operation module 11 receives an indication from, for example, an operator to convert the indication into an indication signal and then delivers the signal to the system controller 20. The display module 12 displays information pieces such as characters and video images. The communication module 13 connects to, for example, the network NW to supervise a state of communication with, for example, the database servers and the terminals. The drive module 14 reads data and other information items from disks DK such as a flexible disk, a Compact Disc (CD), and a Digital Versatile Disc (DVD) and writes data in the disks. The storage 15 is, for example, a hard disk drive to store various programs and data items therein. The I/O interface module 16 executes interface processing between the system controller 20 and the operation module 11, the display 12, the communication module 13, the drive module 14, and the storage 15. The system controller 20 includes, for example, a Central Processing Unit (CPU) 17, a Read Only Memory (ROM) 18, and a Random Access Memory (RAM) 19.

The storage 15 stores therein, for example, programs including those of a predetermined operating system. These programs may be obtained via the network NW from, for example, another server or may be acquired via the drive module 14 from the disk DK such as a CD-ROM.

In the exemplary embodiment, the system controller 20 includes examples of a first topic section, a second topic section, a similarity check section, a replacement section, a sales section, and a payment section in accordance with the present invention.

In operation of the system controller 20, the CPU 17 reads various programs from the ROM 18 and the storage 15 and executes the programs to supervise the respective sections of the copyright managing server 4. The controller 20 thereby serves functions of the first and second topic sections, the similarity check section, the replacement section, the sales section, and the payment section.

Functions of these sections will now be described.

When a user transmits or uploads content from, for example, the user terminal A, the mobile picture storage server 3 receives the content via the network NW and registers it to the mobile picture database 3a. When a second user issues a request to browse the content, the mobile picture storage server 3 delivers the content to, for example, the Web browser of the terminal, e.g., the terminal B of the second user to thereby provide the user with the content. The system controller 20 as the first topic section extracts audio data from the content registered to the mobile picture database 3a, converts the data into text data to extract therefrom keywords, and executes topic processing based on the keywords to create topic information. To produce the topic information, the system employs, for example, text mining processing.

The text mining processing is a scheme in which a set of texts not particularly formatted are subdivided into words and phrases by use of a natural language analysis to analyze appearance frequencies thereof and correlations therebetween to resultantly obtain information items useful for the system. In the text mining processing, information items are extracted to be analyzed (through a mining process) and then the processing is executed in a sequence of results of the analysis. In accordance with the exemplary embodiment, in the extraction of the predetermined information items, the audio data attained from the content is converted into text data to extract keywords from the text data. For analyzing, topic processing is executed by use of the keywords. In the extraction of the analyzed results, topic information is created by use of the information resultant from the topic processing. As the similarity check section, the system controller 20 compares the topic information between two contents for similarity therebetween to determine whether or not the contents are similar to each other.

Figure 3:
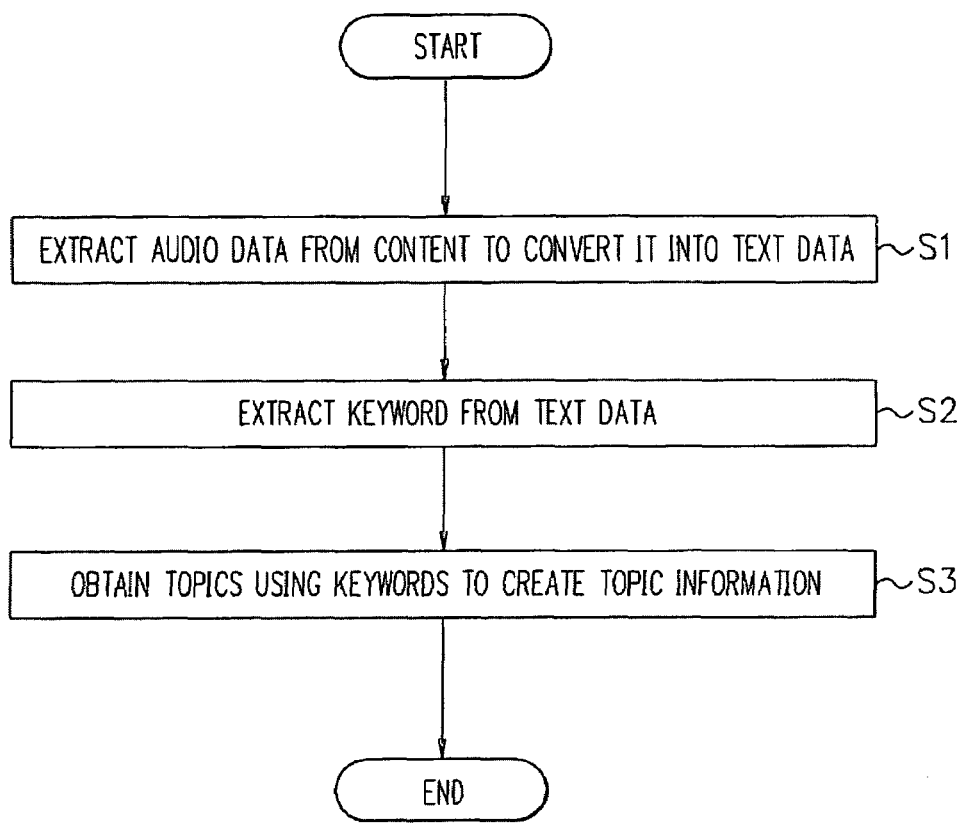
FIG. 3 is a flowchart showing text mining as an example of processing in a first topic section.
Figure 4:
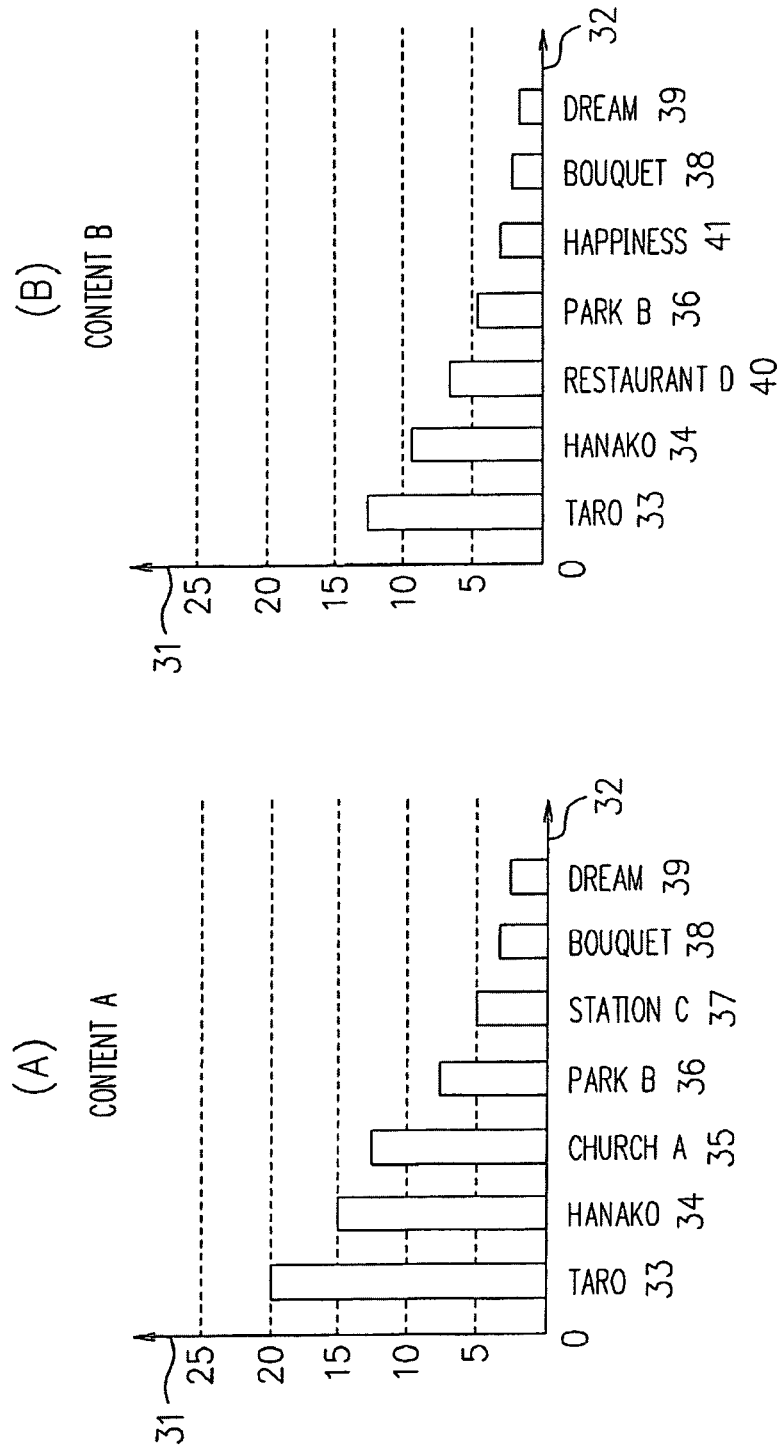
FIG. 4 is a diagram showing images of histograms representing frequency of presence of keywords in contents, specifically, topic information items in contents A and B.

Referring to FIGS. 3 and 4, description will be given of operations of the system controller 20 as the first and second topic sections and the similarity check section.

FIG. 3 shows, in a flowchart, text mining as an example of processing in the first or second topic section.

In FIG. 3, the system controller 20 extracts audio data from the content stored in the mobile picture database 3*a* to convert the data into text data (step S1). The method of extracting the audio data is well known and hence detailed description thereof will be avoided.

Next, the system controller 20 extracts keywords from the text data (step S2). This is accomplished by a sound and voice recognition technique using, for example, a Hidden Markov Model. The technique is well known and hence will not be described in detail. In the text mining, if the content is a film, the keywords are obtained from in, for example, conversations between actors in the film, such as a name and a hometown of a character and words related actions of the character. The system controller 20 extracts these keywords.

Based on the keywords, the system controller 20 executes topic processing to produce topic information (step S3). In order that the content is featured to be discriminable from the other contents on the basis of similarity thereto, the topic processing is executed to extract information items as materials for the check or determination of similarity.

For example, the number of appearances of each of the keywords in the content is counted and is numerically represented to create a histogram based thereon. FIG. 4 shows images of such histograms of the contents A and B respectively in sections (A) and (B).

Section (A) of FIG. 4 is an image of the histogram representing appearance frequencies of keywords in the content A. The ordinate 31 indicates the frequency of appearances of each keyword, the abscissa 32 indicates the kind of each keyword in the content A. As can be seen from section (A), the appearance frequency of "Taro 33" is 20 and that of "Hanako 34" is 15. This similarly applies to "church A 34", "park B 36", "station C 37", "bouquet 38" and "dream 39". In this fashion, the content is featured through the topic processing.

Under control of the system controller 20, the text mining server 6 saves results of the topic processing as topic information in the topic database 6*a*.

As the second topic section, the system controller 20 extracts audio data from the content registered to the video database 8*a* to convert the data into text data and then extracts keywords therefrom. Based on the keywords, the system controller 20 executes topic processing to create topic information for the copyrighted content.

The generation of topic information may not be limited to the above methods. For example, the system controller 20 may analyze a relationship between the keywords to create topic information and may store the topic information in the topic database 6*a*.

As the similarity check section, the system controller 20 makes a check for similarity between two contents on the basis of the topic information stored in the topic database 6*a*.

Next, the similarity check will be specifically described by referring to (A) and (B) of FIG. 4.

As above, these graphs are histogram images of appearance frequencies of keywords in the contents A and B and represent topic information of the contents A and B.

The contents A and B are data items of films. Content B is less in the data capacity than content A, that is, the film of content B is less in time than that of content A. Presence or absence of similarity between contents A and B is determined as follows.

As can be seen from (B) of FIG. 4, according to the relation between the keywords and appearance frequencies thereof in the content B, the keywords are arranged in a descending sequence of appearance frequency as "Taro 33" appearing about 12 times, "Hanako 34" appearing about nine times, "restaurant D 40", "park B 36", "happiness 41", "bouquet 38" and "dream 39". While section (A) includes "church A 34" and "station C 37", these keywords are absent from section (B) and "restaurant D 40" and "happiness 41" are included in place thereof. The other keywords are commonly extracted and the appearance frequencies thereof are the same in the respective contents.

These common keywords, i.e., "Taro 33", "Hanako 34", "park B 36", "bouquet 38" and "dream 39" appear in the same appearance frequency order in the contents A and B. However, the frequency of appearances of each common keyword is less in the content B than in the content A. This is because the content B is less in the recording time than the content A, indicating that the content B is a file containing some scenes of the content A. Therefore, although the frequency of appearances of each keyword differs between the contents A and B in the determination for similarity therebetween, there exists a similar sequence of appearance frequencies of the keywords between the contents A and B. Hence, it is determined that the content B is a file having stored part of the content A. This indicates that the file of the content A is similar or almost equal to that of the content B.

As described above, similarity between two contents is determined by comparing the topic information between the contents. However, the determination of similarity is not restricted by the exemplary embodiment, but may also be carried out by analyzing the relationship between keywords as described above.

Referring now to FIG. 5, description will be given of an outline of processing of the copyright managing system in the exemplary embodiment.

FIG. 5 shows a sequence chart showing the processing of the copyright managing system in accordance with the exemplary embodiment.

First, a copyright holder of content requests a manager of copyrights, for example, a copyright managing firm to manage the copyright of the content.

On receiving the request, the copyright managing firm then manages the copyright using, for example, the copyright managing server 4. Concretely, the firm registers the content to the video database 8*a* under control of the system controller 20 (step S11). However, the content registration is not restricted by the exemplary embodiment. The copyright holder may also register the content to the video database 8*a*.

To encrypt the content and to register the encrypted content to the encrypted mobile picture database 9*a*, the system controller 20 delivers the content to the mobile picture replacement server 9 (step S12). In response to an instruction from the system controller 20, the mobile picture replacement server 9 encrypts the content to store the resultant content to the encrypted mobile picture database 9*a* (step S13).

In order to extract topic information from the content in concurrence with the processing of steps S12 and S13, the system controller 20 requests the video/audio server 8 to transmit audio data of the content thereto (step S14). After receiving the audio data (step S15), the system controller 20 operates as the first topic section (reference is to be made to FIG. 3) to convert the audio data into text data (step S16) and then extracts keywords from the text data (step S17). The system controller 20 executes the topic processing on the basis of the keywords. Using information obtained by the topic processing, the system controller 20 creates topic information (step S18) to register the topic information to the topic database 6*a*.

The system sequentially registers contents of respective copyright holders in this way. According to the topic information of the contents thus registered, the copyright managing firm makes a check to determine whether or not content arbitrarily uploaded onto the network is similar to the content of the copyright holder registered as above. If similarity is present therebetween, it is quite likely that the content is uploaded with an infringement of copyright. Hence, the system takes an action, for example, issues a warning message.

Specifically, to make content open to other users, a user sends or uploads the content from the user terminal A1 to the mobile picture storage server 3 (step S19). When the content is received, the mobile picture storage server 3 makes the content open to the public (step S20). Ordinarily, the user may upload content at any time from any place.

The system controller 20 makes a check to determine presence or absence of content opened to the public with an infringement of copyright. To obtain topic information from the content uploaded in the mobile picture storage server 3, the system controller 20 extracts the audio file of the content (step S21). As the second topic section (FIG. 3), the system controller 20 converts the audio data into text data (step S22) to extract keywords from the text data (step S23). The system controller 20 executes the topic processing by use of the keywords to produce information. Based on the information, the system controller 20 creates topic information (step S24) to register the topic information to the topic database 6*a*.

By use of the topic information stored in the topic database 6*a*, the system controller 20 makes a check for similarity between the content and the content for which the copyright holder has requested the copyright management (FIG. 4 and step S25 in FIG. 5).

If similarity is absent as a result ("not similar" in step S25), the processing is terminated.

If similarity is present ("similar" in step S25), it means that the content uploaded in the mobile picture storage server 3 is similar to the content of the copyright holder. Therefore, to prevent the public or general users from browsing the content thus opened to the public, the system issues a recommendation to the user of the content to replace the content by the content registered to the encrypted mobile picture database 9*a* (step S26). If the user accepts the recommendation (step S27), the system controller 20 as the replacement section sends a replacement instruction to the mobile picture replacement server 9 to replace the content by second content (step S28). In response to the instruction, the mobile picture replacement server 9 sends the encrypted content as an example of the second content to the mobile picture storage server 3 (step S29). When the second content is received, the mobile picture storage server 3 replaces the content transmitted to the mobile picture storage server 3 by the user by the encrypted content (step S30). The second content is not limited to encrypted content, but may be, for example, part of copyrighted content, the part having a limited playback time.

When another user, for example, a third person having browsed the content opened to the public by the mobile picture storage server 3, desires to purchase the content, the person operates his or her terminal, e.g., the user terminal B2 to pay money to the copyright managing server 4 (step S31). As the sales section, the system controller 20 receives the operation of the payment and delivers the content to the user. To process the operation of the payment, the system controller 20 instructs the CPU 17 to read a payment processing program from the ROM 18 or the storage 15 to execute the program.

After the content is purchased, according to the payment made by the user, the system controller 20 as the payment section pays the royalty of copyright to the copyright holder (step S33).

In accordance with the exemplary embodiment, the system controller 20 extracts audio data of content from the mobile picture database 3*a* and audio data of copyrighted content from the video database 8*a*. For each content, the system controller 20 converts the audio data into text data to extract keywords from the text data. By executing the topic processing for the keywords, the system controller 20 creates topic information of each of the contents and then compares the topic information between the contents to determine presence or absence of similarity therebetween.

Since whether or not content opened on the network is assigned with a copyright can be determined without any human operation, for example, operation to visually check or to view the content, it is possible to quickly and correctly detect any infringement of copyright of the content. Also, since similarity between the contents can be determined, it is possible to quickly and correctly detect, in addition to the infringement of copyright, an infringement of rights associated with the copyright, such as the right of reproduction and the right of retention of identicalness. Therefore, the content can be protected in various ways by the copyright.

If the content opened to the public on the network is assigned with a copyright, the system controller 20 can encrypt the content. This makes it possible to prevent an unspecified number of general users from viewing the content without admission.

When the user purchases encrypted content and pays for the content, the system controller 20 can transmit the content to the user. Hence, the content is processed in a so-called, super-distribution system. This enhances sales promotion for the service providers and also gives a chance to remarkably develop the sales.

When the sales section sells the content to the user, the system controller 20 can conduct the processing of payment for the copyright manager of the content. The payment is also carried out for the copyright holder of the content when the content is used, enabling the super-distribution of contents. This consequently improves sales promotion for the copyright holders and provides them a chance to further develop the sales.

In the information processing system in accordance with the present invention, the copyright managing information processing apparatus compares topic information produced using content opened to the public on a network with topic information created by use of copyrighted content beforehand registered to the copyright managing information processing apparatus to thereby determine presence or absence of similarity between the contents.

Therefore, whether or not the content opened to the public on the network is assigned with a copyright can be determined without using human power, for example, without the visual check of the content or the viewing of the content. This leads to a quick and correct detection of any infringement of copyright of the content.

As above, since similarity between the contents can be determined, it is also possible to detect, in addition to the infringement of copyright, any infringement of rights associated with the copyright, such as the right of reproduction and the right of retention of identicalness. Hence, the content is protected in various ways by the copyright.

In accordance with a first exemplary aspect of the present invention, there is provided a copyright managing information processing apparatus including a storage module for storing content including copyrighted audio data, a first topic module for recognizing audio data in content opened to the public by a to-be-opened information processing apparatus, converting the audio data into text data, extracting keywords from the text data, and conducting topic processing using the keywords to create topic information; a second topic module for recognizing audio data in content stored in the storage module, converting the audio data into text data, extracting keywords from the text data, and conducting topic processing using the keywords to create topic information; and a similarity determining module for comparing the topic information generated by the first topic module with that created by the second topic module and for thereby determining presence or absence of similarity therebetween.

In accordance with the present invention, the copyright managing information processing apparatus compares topic information generated by content opened to the public on a network with topic information obtained by copyrighted content beforehand registered to the copyright managing information processing apparatus to resultantly determine presence or absence of similarity between the contents.

Therefore, whether or not the content opened on a network is assigned with a copyright can be determined without requiring operation of a human, for example, operation to visually check the content or to view the content. Therefore, any infringement of copyright of the content can be quickly and appropriately detected.

Since similarity between the contents can be determined as above, it is possible to detect not only the infringement of copyright, but also an infringement of rights associated with the copyright, such as the right of reproduction and the right of retention of identicalness. Accordingly, the content is protected in various ways by the copyright.

In accordance with a second exemplary aspect of the present invention, there is provided a copyright managing information processing apparatus configured by adding to the copyright managing information processing apparatus in accordance with the first exemplary aspect of the present invention, a replacement module for replacing, if the similarity determining module determines presence of similarity between the contents, the content opened to the public on the network by the to-be-opened information processing apparatus by second content.

In accordance with the present invention, if the content opened to the public on the network is copyrighted content, the copyright managing information processing apparatus replaces the copyrighted content by second content.

Therefore, if the content opened to the public on the network is copyrighted, it is possible to prevent an unspecified number of general users from, for example, viewing the content without authority.

In accordance with a third exemplary aspect of the present invention, there is provided a copyright managing information processing apparatus configured by adding to the copyright managing information processing apparatus in accordance with the second exemplary aspect of the present invention, a selling module which makes it possible, in response to payment of a second user for the content, to transmit the encrypted content to the second user.

In accordance with the present invention, in a situation wherein the content opened to the public on the network is copyrighted content, if the user conducts processing of payment for the content, the processing apparatus is capable of selling the content to the user.

This advantageously leads to the super-distribution of the content. The processing apparatus hence enhances sales promotion for the service providers and also gives a chance for the service providers to remarkably expand the sales.

In according with a fourth exemplary aspect of the present invention, there is provided a copyright managing information processing apparatus configured by adding to the copyright managing information processing apparatus in accordance with the third exemplary aspect of the present invention, a paying module for conducting, when the selling module sells the content to the second user, processing of payment for a manager of the content.

In accordance with the present invention, in a case wherein the content opened on the network is copyrighted content, if the user conducts processing of payment for the content, the processing apparatus executes the payment processing for the copyright holder of the content.

Hence, when a user utilizes the copyrighted content, the processing of payment for the content is carried out for the copyright holder of the content. This leads to the super-distribution of the content, which enhances and improves sales promotion as well as sales development and expansion for the copyright holders.

In accordance with the present invention, whether or not the content opened to the public on a network is assigned with a copyright can be determined without any human operation, for example, operation to visually check the content or to view the content. It is hence possible to quickly and appropriately detect any infringement of copyright of the content.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined claims.

What is claimed is:

1. An information processing system comprising:
   a terminal;
   a to-be-opened information processing apparatus connectible via a network to the terminal; and
   a copyright managing information processing apparatus connectible via a network to the to-be-opened information processing apparatus, wherein:
   the terminal comprises a transmitting unit which transmits to the to-be-opened information processing apparatus content including audio data, the content being inputted from a user;
   the to-be-opened information processing apparatus comprises:
   a content receiving unit which receives the content from the terminal connected via the network to the to-be-opened information processing apparatus, and
   an opening unit which opens the received content to the public on the network; and
   the copyright managing information processing apparatus comprises:
   a storage means which stores copyrighted content including audio data;
   a first topic unit which recognizes audio data in content opened to the public by the to-be-opened information processing apparatus; converting the audio data into text data, extracting keywords from the text data, and conducting topic processing using the keywords to create topic information;
   a second topic unit which recognizes audio data in content stored in the storage unit, converting the audio data into text data, extracting keywords from the text data, and conducting topic processing using the keywords to create topic information; and a similarity determining unit which compares the topic information generated by the first topic unit with that created by the second topic unit and for thereby determining presence or absence of similarity therebetween; and a replacement unit which recommends for replacement, if the similarity determining unit determines presence of similarity between the content, the content opened to the public on the network by the to-be-opened information processing apparatus by second content.

2. A copyright managing information processing apparatus, comprising:
   a storage device which stores copyrighted content including audio data;
   a processor; and
   a memory which stores instructions to be executed by the processor, the instructions causing the processor to perform:
   a first topic unit which recognizes audio data in content opened to the public by a to-be-opened information processing apparatus, converting the audio data into text data, extracting keywords from the text data, and conducting topic processing using the keywords to create topic information;
   a second topic unit which recognizes audio data in content stored in the storage unit, converting the audio data into text data, extracting keywords from the text data, and conducting topic processing using the keywords to create topic information; and
   a similarity determining unit which compares the topic information generated by the first topic unit with that created by the second topic unit and for thereby determining presence or absence of similarity therebetween; and
   a replacement unit which recommends for replacement, if the similarity determining unit determines presence of similarity between the content, the content opened to the public on the network by the to-be-opened information processing apparatus by second content.

3. The copyright managing information processing apparatus in accordance with claim 2, wherein if the similarity determining unit determines presence of similarity between the content, the replacement unit recommends to a user that the content opened to the public on the network by the to-be-opened information processing apparatus be replaced by second content.

4. The copyright managing information processing apparatus in accordance with claim 3, wherein the memory stores further instructions causing the processor to perform a selling unit which makes it possible, in response to payment of a second user for the content, to transmit the encrypted content to the second user.

5. The copyright managing information processing apparatus in accordance with claim 4, wherein the memory stores further instructions causing the processor to perform a paying unit which conducts, when the selling unit sells the content to the second user, processing of payment for a manager of the content.

6. A copyright managing information processing method, comprising:
   a step of storing copyrighted content including audio data;
   a first topic step of recognizing audio data in content opened to the public by a to-be-opened information processing apparatus, converting the audio data into text data, extracting keywords from the text data, and conducting topic processing using the keywords to create topic information;
   a second topic step of recognizing audio data in content stored by the storing step, converting the audio data into text data, extracting keywords from the text data, and conducting topic processing using the keywords to create topic information; and
   a similarity determining step of comparing the topic information generated by the first topic step with that created by the second topic step and thereby determining presence or absence of similarity therebetween; and
   a replacement step of recommending for replacement, if a determination of presence of similarity between the content is made, the content opened to the public on the network by the to-be-opened information processing apparatus by second content.

7. A non-transitory storage medium for storing an information processing program for making a computer included in a copyright managing information processing apparatus including a storage module for storing copyrighted content including audio data, conduct functions of:
   first topic processing of recognizing audio data in content opened to the public by a to-be-opened information processing apparatus; converting the audio data into text data, extracting keywords from the text data, and conducting topic processing using the keywords to create topic information;
   second topic processing of recognizing audio data in content stored in the storage module, converting the audio data into text data, extracting keywords from the text data, and conducting topic processing using the keywords to create topic information; and
   similarity determining processing of comparing the topic information generated by the first topic processing with that created by the second topic processing and of thereby determining presence or absence of similarity therebetween; and
   recommending for replacement, if a determination of presence of similarity between the content is made, the content opened to the public on the network by the to-be-opened information processing apparatus by second content.

* * * * *